United States Patent [19]

Nakamura et al.

[11] Patent Number: 5,479,525
[45] Date of Patent: Dec. 26, 1995

[54] METHOD AND APPARATUS FOR ROTATING A MULTIVALUED PICTURE IMAGE 90 DEGREES

[75] Inventors: Kenji Nakamura, Kawasaki; Yutaka Ozaki, Tsuchiura, both of Japan

[73] Assignee: Matsushita Electric Industrial Co., Ltd., Osaka, Japan

[21] Appl. No.: 197,994

[22] Filed: Feb. 17, 1994

[30] Foreign Application Priority Data

Jul. 19, 1993 [JP] Japan .................................. 5-177880

[51] Int. Cl.$^6$ .................................................. G06T 3/60
[52] U.S. Cl. .......................... 382/297; 395/137; 348/583; 345/126
[58] Field of Search ...................... 382/46, 47; 348/583, 348/718; 345/126; 395/137

[56] References Cited

U.S. PATENT DOCUMENTS

| | | | |
|---|---|---|---|
| 4,918,527 | 4/1990 | Penard et al. | 348/718 |
| 5,034,733 | 7/1991 | Okazawa et al. | 382/46 |
| 5,124,692 | 7/1992 | Sasson | 345/126 |
| 5,412,768 | 5/1995 | Ozaki | 395/137 |

FOREIGN PATENT DOCUMENTS 3216772  9/1991  Japan .

Primary Examiner—Michael T. Razavi
Assistant Examiner—Larry J. Prikockis
Attorney, Agent, or Firm—Lowe, Price, LeBlanc & Becker

[57] ABSTRACT

To rotate a multivalued source picture image consisting of picture data arranged in N rows×(m gradations*N) columns 90 degrees, calculating a maximum value of a transposition mode L according to an equation $M=[\log_2 N]$, repeatedly selecting an A-th row by increasing a row number A in increments of 1 in the range $k*2^L \leq A \leq k*2^L + 2^{L-1} - 1$ in an inner loop and increasing a value k in increments of 1 in the range $0 \leq k \leq N/2^L - 1$ in a middle loop while increasing the transposition mode L in increments of 1 in the range of 1 to M in an outer loop, selecting a B-th row according to an equation $B=A+2^{L-1}$ each time the A-th row is selected, transposing the picture data A(j) arranged at j-th columns of the A-th row to A'(j) and the picture data. $A(j+m*2^{L-1})$ to B'(j) arranged at the B-th row in the range $p*m*2^L \leq j \leq p*m*2^L + m*2^{L-1} - 1$ and $0 \leq p \leq N/2^L - 1$, transposing the picture data B(j) arranged at j-th columns of the B-th row to B'(j) and the picture data $B(j-m*2^{L-1})$ to A'(j) in the range $p*m*2^L + m*2^{L-1} \leq j \leq p*m*2^L + m*2^L - 1$ to form a quasi-transposed picture image, and changing picture data $E(i, m*(N-j-1)+q)$ of the quasi-transposed picture image to $F(m*j+q)$ in the range $0 \leq j \leq N-1$ and $0 \leq q \leq m-1$ to form a destination picture image.

3 Claims, 8 Drawing Sheets

FIG. 1(a) PRIOR ART

|  | 0-TH COLUMN | FIRST COLUMN | SECOND COLUMN | THIRD COLUMN | FOURTH COLUMN | FIFTH COLUMN | SIXTH COLUMN | SEVENTH COLUMN |
|---|---|---|---|---|---|---|---|---|
| 0-TH ROW | $0_1$ | $0_2$ | $1_1$ | $1_2$ | $2_1$ | $2_2$ | $3_1$ | $3_2$ |
| FIRST ROW | $4_1$ | $4_2$ | $5_1$ | $5_2$ | $6_1$ | $6_2$ | $7_1$ | $7_2$ |
| SECOND ROW | $8_1$ | $8_2$ | $9_1$ | $9_2$ | $A_1$ | $A_2$ | $B_1$ | $B_2$ |
| THIRD ROW | $C_1$ | $C_2$ | $D_1$ | $D_2$ | $E_1$ | $E_2$ | $F_1$ | $F_2$ |

FIG. 1(c) PRIOR ART

PHASE-17

| $C_1$ | $C_2$ | $8_1$ | $8_2$ | $4_1$ | $4_2$ | $0_1$ | $0_2$ |
|---|---|---|---|---|---|---|---|
| $D_1$ | $D_2$ | $9_1$ | $9_2$ | $5_1$ | $5_2$ | $1_1$ | $1_2$ |
| $E_1$ | $E_2$ | $A_1$ | $A_2$ | $6_1$ | $6_2$ | $2_1$ | $2_2$ |
| $F_1$ | $F_2$ | $B_1$ | $B_2$ | $7_1$ | $7_2$ | $3_1$ | $3_2$ |

FIG. 1(b) PRIOR ART

PHASE-1

| $0_1$ | $0_2$ | | | | | | |
|---|---|---|---|---|---|---|---|
| | | | | | | | |
| | | | | | | | |
| | | | | | | | |

PHASE-2

| $0_1$ | $0_2$ | | | | | | |
|---|---|---|---|---|---|---|---|
| $1_1$ | $1_2$ | | | | | | |
| | | | | | | | |
| | | | | | | | |

PHASE-3

| $0_1$ | $0_2$ | | | | | | |
|---|---|---|---|---|---|---|---|
| $1_1$ | $1_2$ | | | | | | |
| $2_1$ | $2_2$ | | | | | | |
| | | | | | | | |

PHASE-4

| $0_1$ | $0_2$ | | | | | | |
|---|---|---|---|---|---|---|---|
| $1_1$ | $1_2$ | | | | | | |
| $2_1$ | $2_2$ | | | | | | |
| $3_1$ | $3_2$ | | | | | | |

PHASE-5

| $0_1$ | $0_2$ | $4_1$ | $4_2$ | | | | |
|---|---|---|---|---|---|---|---|
| $1_1$ | $1_2$ | | | | | | |
| $2_1$ | $2_2$ | | | | | | |
| $3_1$ | $3_2$ | | | | | | |

PHASE-6

| $0_1$ | $0_2$ | $4_1$ | $4_2$ | | | | |
|---|---|---|---|---|---|---|---|
| $1_1$ | $1_2$ | $5_1$ | $5_2$ | | | | |
| $2_1$ | $2_2$ | | | | | | |
| $3_1$ | $3_2$ | | | | | | |

PHASE-7

| $0_1$ | $0_2$ | $4_1$ | $4_2$ | | | | |
|---|---|---|---|---|---|---|---|
| $1_1$ | $1_2$ | $5_1$ | $5_2$ | | | | |
| $2_1$ | $2_2$ | $6_1$ | $6_2$ | | | | |
| $3_1$ | $3_2$ | | | | | | |

PHASE-8

| $0_1$ | $0_2$ | $4_1$ | $4_2$ | | | | |
|---|---|---|---|---|---|---|---|
| $1_1$ | $1_2$ | $5_1$ | $5_2$ | | | | |
| $2_1$ | $2_2$ | $6_1$ | $6_2$ | | | | |
| $3_1$ | $3_2$ | $7_1$ | $7_2$ | | | | |

PHASE-9

| $0_1$ | $0_2$ | $4_1$ | $4_2$ | $8_1$ | $8_2$ | | |
|---|---|---|---|---|---|---|---|
| $1_1$ | $1_2$ | $5_1$ | $5_2$ | | | | |
| $2_1$ | $2_2$ | $6_1$ | $6_2$ | | | | |
| $3_1$ | $3_2$ | $7_1$ | $7_2$ | | | | |

PHASE-10

| $0_1$ | $0_2$ | $4_1$ | $4_2$ | $8_1$ | $8_2$ | | |
|---|---|---|---|---|---|---|---|
| $1_1$ | $1_2$ | $5_1$ | $5_2$ | $9_1$ | $9_2$ | | |
| $2_1$ | $2_2$ | $6_1$ | $6_2$ | | | | |
| $3_1$ | $3_2$ | $7_1$ | $7_2$ | | | | |

PHASE-11

| $0_1$ | $0_2$ | $4_1$ | $4_2$ | $8_1$ | $8_2$ | | |
|---|---|---|---|---|---|---|---|
| $1_1$ | $1_2$ | $5_1$ | $5_2$ | $9_1$ | $9_2$ | | |
| $2_1$ | $2_2$ | $6_1$ | $6_2$ | $A_1$ | $A_1$ | | |
| $3_1$ | $3_2$ | $7_1$ | $7_2$ | | | | |

PHASE-12

| $0_1$ | $0_2$ | $4_1$ | $4_2$ | $8_1$ | $8_2$ | | |
|---|---|---|---|---|---|---|---|
| $1_1$ | $1_2$ | $5_1$ | $5_2$ | $9_1$ | $9_2$ | | |
| $2_1$ | $2_2$ | $6_1$ | $6_2$ | $A_1$ | $A_2$ | | |
| $3_1$ | $3_2$ | $7_1$ | $7_2$ | $B_1$ | $B_2$ | | |

PHASE-13

| $0_1$ | $0_2$ | $4_1$ | $4_2$ | $8_1$ | $8_2$ | $C_1$ | $C_2$ |
|---|---|---|---|---|---|---|---|
| $1_1$ | $1_2$ | $5_1$ | $5_2$ | $9_1$ | $9_2$ | | |
| $2_1$ | $2_2$ | $6_1$ | $6_2$ | $A_1$ | $A_2$ | | |
| $3_1$ | $3_2$ | $7_1$ | $7_2$ | $B_1$ | $B_2$ | | |

PHASE-14

| $0_1$ | $0_2$ | $4_1$ | $4_2$ | $8_1$ | $8_2$ | $C_1$ | $C_2$ |
|---|---|---|---|---|---|---|---|
| $1_1$ | $1_2$ | $5_1$ | $5_2$ | $9_1$ | $9_2$ | $D_1$ | $D_2$ |
| $2_1$ | $2_2$ | $6_1$ | $6_2$ | $A_1$ | $A_2$ | | |
| $3_1$ | $3_2$ | $7_1$ | $7_2$ | $B_1$ | $B_2$ | | |

PHASE-15

| $0_1$ | $0_2$ | $4_1$ | $4_2$ | $8_1$ | $8_2$ | $C_1$ | $C_2$ |
|---|---|---|---|---|---|---|---|
| $1_1$ | $1_2$ | $5_1$ | $5_2$ | $9_1$ | $9_2$ | $D_1$ | $D_2$ |
| $2_1$ | $2_2$ | $6_1$ | $6_2$ | $A_1$ | $A_2$ | $E_1$ | $E_2$ |
| $3_1$ | $3_2$ | $7_1$ | $7_2$ | $B_1$ | $B_2$ | | |

PHASE-16

| $0_1$ | $0_2$ | $4_1$ | $4_2$ | $8_1$ | $8_2$ | $C_1$ | $C_2$ |
|---|---|---|---|---|---|---|---|
| $1_1$ | $1_2$ | $5_1$ | $5_2$ | $9_1$ | $9_2$ | $D_1$ | $D_2$ |
| $2_1$ | $2_2$ | $6_1$ | $6_2$ | $A_1$ | $A_2$ | $E_1$ | $E_2$ |
| $3_1$ | $3_2$ | $7_1$ | $7_2$ | $B_1$ | $B_2$ | $F_1$ | $F_2$ |

SYMMETRICAL AXIS

MODE 1

MODE 2

MODE 3

FIG. 6(a)

|  (j) | 0 | 1 | 2 | 3 | 4 | 5 | 6 | 7 |
|---|---|---|---|---|---|---|---|---|
| (i) | | | | | | | | |
| 0 | $0_1$ | $0_2$ | $1_1$ | $1_2$ | $2_1$ | $2_2$ | $3_1$ | $3_2$ |
| 1 | $4_1$ | $4_2$ | $5_1$ | $5_2$ | $6_1$ | $6_2$ | $7_1$ | $7_2$ |
| 2 | $8_1$ | $8_2$ | $9_1$ | $9_2$ | $A_1$ | $A_2$ | $B_1$ | $B_2$ |
| 3 | $C_1$ | $C_2$ | $D_1$ | $D_2$ | $E_1$ | $E_2$ | $F_1$ | $F_2$ |

FIG. 6(b)

PHASE-1

|  (j) | 0 | 1 | 2 | 3 | 4 | 5 | 6 | 7 |
|---|---|---|---|---|---|---|---|---|
| (i) | | | | | | | | |
| 0 | $0_1$ | $0_2$ | $4_1$ | $4_2$ | $2_1$ | $2_2$ | $6_1$ | $6_2$ |
| 1 | $1_1$ | $1_2$ | $5_1$ | $5_2$ | $3_1$ | $3_2$ | $7_1$ | $7_2$ |
| 2 | $8_1$ | $8_2$ | $9_1$ | $9_2$ | $A_1$ | $A_2$ | $B_1$ | $B_2$ |
| 3 | $C_1$ | $C_2$ | $D_1$ | $D_2$ | $E_1$ | $E_2$ | $F_1$ | $F_2$ |

FIG. 6(c)

PHASE-2

|  (j) | 0 | 1 | 2 | 3 | 4 | 5 | 6 | 7 |
|---|---|---|---|---|---|---|---|---|
| (i) | | | | | | | | |
| 0 | $0_1$ | $0_2$ | $4_1$ | $4_2$ | $2_1$ | $2_2$ | $6_1$ | $6_2$ |
| 1 | $1_1$ | $1_2$ | $5_1$ | $5_2$ | $3_1$ | $3_2$ | $7_1$ | $7_2$ |
| 2 | $8_1$ | $8_2$ | $C_1$ | $C_2$ | $A_1$ | $A_2$ | $E_1$ | $E_2$ |
| 3 | $9_1$ | $9_2$ | $D_1$ | $D_2$ | $B_1$ | $B_2$ | $F_1$ | $F_2$ |

FIG. 6(d)

PHASE-3

|  (j) | 0 | 1 | 2 | 3 | 4 | 5 | 6 | 7 |
|---|---|---|---|---|---|---|---|---|
| (i) | | | | | | | | |
| 0 | $0_1$ | $0_2$ | $4_1$ | $4_2$ | $8_1$ | $8_2$ | $C_1$ | $C_2$ |
| 1 | $1_1$ | $1_2$ | $5_1$ | $5_2$ | $3_1$ | $3_2$ | $7_1$ | $7_2$ |
| 2 | $2_1$ | $2_2$ | $6_1$ | $6_2$ | $A_1$ | $A_2$ | $E_1$ | $E_2$ |
| 3 | $9_1$ | $9_2$ | $D_1$ | $D_2$ | $B_1$ | $B_2$ | $F_1$ | $F_2$ |

FIG. 6(e)

PHASE-4

|  (j) | 0 | 1 | 2 | 3 | 4 | 5 | 6 | 7 |
|---|---|---|---|---|---|---|---|---|
| (i) | | | | | | | | |
| 0 | $0_1$ | $0_2$ | $4_1$ | $4_2$ | $8_1$ | $8_2$ | $C_1$ | $C_2$ |
| 1 | $1_1$ | $1_2$ | $5_1$ | $5_2$ | $9_1$ | $9_2$ | $D_1$ | $D_2$ |
| 2 | $2_1$ | $2_2$ | $6_1$ | $6_2$ | $A_1$ | $A_2$ | $E_1$ | $E_2$ |
| 3 | $3_1$ | $3_2$ | $7_1$ | $7_2$ | $B_1$ | $B_2$ | $F_1$ | $F_2$ |

FIG. 6(f)

PHASE-5

|  (j) | 0 | 1 | 2 | 3 | 4 | 5 | 6 | 7 |
|---|---|---|---|---|---|---|---|---|
| (i) | | | | | | | | |
| 0 | $C_1$ | $C_2$ | $8_1$ | $8_2$ | $4_1$ | $4_2$ | $0_1$ | $0_2$ |
| 1 | $D_1$ | $D_2$ | $9_1$ | $9_2$ | $5_1$ | $5_2$ | $1_1$ | $1_2$ |
| 2 | $E_1$ | $E_2$ | $A_1$ | $A_2$ | $6_1$ | $6_2$ | $2_1$ | $2_2$ |
| 3 | $F_1$ | $F_2$ | $B_1$ | $B_2$ | $7_1$ | $7_2$ | $3_1$ | $3_2$ |

FIG. 6(g)

PHASE-6

|  (j) | 0 | 1 | 2 | 3 | 4 | 5 | 6 | 7 |
|---|---|---|---|---|---|---|---|---|
| (i) | | | | | | | | |
| 0 | $3_1$ | $3_2$ | $7_1$ | $7_2$ | $B_1$ | $B_2$ | $F_1$ | $F_2$ |
| 1 | $2_1$ | $2_2$ | $6_1$ | $6_2$ | $A_1$ | $A_2$ | $E_1$ | $E_2$ |
| 2 | $1_1$ | $1_2$ | $5_1$ | $5_2$ | $9_1$ | $9_2$ | $D_1$ | $D_2$ |
| 3 | $0_1$ | $0_2$ | $4_1$ | $4_2$ | $8_1$ | $8_2$ | $C_1$ | $C_2$ |

METHOD AND APPARATUS FOR ROTATING A MULTIVALUED PICTURE IMAGE 90 DEGREES

BACKGROUND OF THE INVENTION

1. Field of the Invention

The present invention relates to a method and an apparatus for rotating a multivalued picture image 90 degrees by transposing 90 degrees pieces of multivalued picture data which indicate a character, a figure, a pattern, or the like.

2. Description of the Related Art

To display a picture image in a display screen, the display screen has a plurality of pixels arranged in a matrix form, and each of the pixels becomes bright in many types of gradations. Therefore, pieces of multivalued picture data which are arranged in a matrix form and have a plurality of gradations for each of the pixels are required. Also, to rotate the picture,image displayed in the display screen, it is required that the multivalued picture data are rotated 90 degrees in a clockwise direction or a counterclockwise direction.

2.1. Previously Proposed Art

A first conventional method for rotating a source picture image consisting of pieces of multivalued picture data arranged in a matrix of 4 rows×(2 gradations*4) columns 90 degrees in a clockwise direction is described with reference to FIGS. 1(a) to 1(c). The multivalued picture data have two gradations for each of the pixels.

In FIG. 1(a); pieces of multivalued picture data arranged in 4 rows×(2 gradations*4) columns to be rotated 90 degrees in a clockwise direction are shown. A picture image shown in FIG. 1(a) is called a source picture image. In the source picture image, each of pixels corresponds to a set of picture data having 2 gradations such as $(0_1,0_2)$, $(1_1,1_2)$, - - - , or $(F_1,F_2)$. In tile first conventional method, the multivalued picture data of the source picture image are transposed in each set to form a quasi-transposed source matrix according to phase-1 to phase-16 steps. In detail, because the multivalued picture data are read in a word unit (or a row unit) from a memory having a general memory configuration and because each of sets of picture data read from the memory is transposed to a prescribed transposed position, the set $(0_1,0_2)$ arranged at the first row of the source picture image is only read from the memory and is placed at first and second columns of the first row in the phase-1 step, as shown in FIG. 1(b). Thereafter, the set $(1_1,1_2)$ is read and placed at first and second columns of the second row in the phase-2 step, the set $(2_1,2_2)$ is read and placed at first and second columns of the third row in the phase-3 step, and the set $(3_1,3_2)$ is read and placed at first and second columns of the fourth row in the phase-4 step. Thereafter, the sets $(4_1,4_2)$, $(5_1,5_2)$, $(6_1,6_2)$, $(7_1,7_2)$ arranged at the second row of the source picture image are transposed in turn according to the phase-5 step to the phase-8 step in the same manner as in the phase-1 to 4 steps, Thereafter, the sets $(8_1,8_2)$, $(9_1,9_2)$, $(A_1,A_2)$, $(B_1,B_2)$ arranged at the third row of the source picture image are transposed in turn according to the phase-9 step to the phase-12 step, and the sets $(C_1,C_2)$, $(D_1,D_2)$, $(E_1,E_2)$, and $(F_1,F_2)$ arranged at the fourth row of the source picture image are transposed in turn according to the phase-13 step to the phase-10 step.

Thereafter, as shown in FIG. 1(c), each of the sets arranged in the quasi-transposed source matrix is exchanged for another set symmetrically placed about a symmetrical axis positioned in a center of each row in a phase-17 step. A picture image formed in the phase-17 step is called a destination picture image.

Accordingly, because a picture image obtained by rotating the source picture image 90 degrees in the clockwise direction agrees with the destination picture image, the source picture image having 4 rows×(2 gradations ×4) columns can be rotated 90 degrees in the clockwise direction according to the phase-1 step to the phase-16 step of the first conventional method.

2.2. Previously Proposed Art

Also, a second conventional method for rotating pieces of picture data arranged in a matrix of N rows ×N columns 90 degrees is described in Japanese Patent Application No. 13165 of 1990 (H2-13165) which is laid open to public inspection on Sep. 24, 1991 under Provisional Publication No. 216772 of 1991 (H3-216772). However, a method for rotating pieces of multivalued picture data 90 degrees is not described in the Patent Application.

2.3. Problems to be Solved by the Invention

However, in the first conventional method, because the multivalued picture data are read in a word unit, a plurality of sets arranged at different rows of the source picture image cannot be read at the same time. Also, because each set of picture data read from the memory is transposed, a plurality of sets arranged at the same row of the source picture image cannot be read at the same time to transpose the sets. Therefore, there is a drawback that it takes a lot of time to obtain the destination picture image.

Also, in the second conventional method, there is another drawback that pieces of multivalued picture data cannot be rotated 90 degrees.

SUMMARY OF THE INVENTION

A first object of the present invention is to provide, with due consideration to the drawbacks of such a conventional method, a method for rotating a multivalued picture image consisting of pieces of picture data arranged in a matrix of N rows×(m gradations*N) columns 90 degrees in a clockwise direction or a counterclockwise direction.

Also, a second object of the present invention is to provide an apparatus for rotating a multivalued picture image consisting of pieces of picture data arranged in a matrix of N rows×(m gradations*N) columns 90 degrees in a clockwise direction or a counterclockwise direction according to the method.

The first object is achieved by the provision of a method for rotating 90 degrees a multivalued source picture image consisting of pieces of picture data $a_{ij}$ (i=0,1, - - - ,N, j=0,1, - - - , m*N−1) arranged in a matrix of N rows×(m gradations*N) columns, comprising the steps of:

determining a maximum value M of a transition mode L according to a first equation M=[$\log_2 N$], the symbol [x] denoting a ceiling function of a constant x in which a value of [x] agrees with a value of the constant x when the constant x equals a positive integer or a value of [x] agrees with an integer determined by raising a decimal fraction of the constant x to a unit when the constant x has the decimal fraction;

numbering a series of rows of the multivalued source picture image from a 0-th row to an (N−1)-th row;

numbering a series of columns of the multivalued source picture image from a 0-th column to an (m*N−1)-th column;

initially setting the transition mode L to 1;

initially setting a loop counting value k to 0;

selecting an A-th row having a row number A according to a second equations $A=k*2^L$;

selecting a B-th row having a row number B according to a third equation $B=A+2^{L-1}$;

representing the picture data placed in the A-th row of the multivalued source; picture image by A(j);

representing the picture data placed in the B-th row of the multivalued source picture image by B(j);

transposing one or more pieces of picture data placed in the A-th row according to a fourth equation $B'(j)=A(j+m*2^{L-1})$ in a range of the columns $p*m*2^L \leq j \leq p*m*2^L+m*2^{L-1}-1$, a variable p being increased from 0 to $N/2^L-1$ in increments of 1;

transposing one or more pieces of picture data placed in the B-th row according to a fifth equation $A'(j)=B(j-m*2^{L-1})$ in a range of the columns $p*m*2^L+m*2^{L-1} \leq j \leq p*m*2^L+m*2^L-1$, a variable p being increased from 0 to $N/2^L-1$ in increments of 1;

holding each of remaining pieces of picture data placed in the A-th row at the same row and column according to a sixth equation $A'(j)=A(j)$ in a range of the columns $p*m*2^L \leq j \leq p*m*2^L+m*2^{L-1}-1$, a variable p being increased from 0 to $N/2^L-1$ in increments of 1;

holding each of remaining pieces of picture data placed in the B-th row at the same row and column according to a seventh equation $B'(j)=B(J)$ in a range of the columns $p*m*2^L+m*2^{L-1} \leq j \leq p*m*2^L+m*2^L-1$, a variable p being increased from 0 to $N/2^L-1$ in increments of 1;

regarding the picture data A'(j), B'(j) as pieces of picture data A(j), B(j) of an intermediate picture image;

increasing the row number A in increments of 1 in the range from $k*2^L$ to $k*2^L+2^{L-1}-1$ to repeatedly performing the step of selecting a B-th row, two types of steps of transposing one or more pieces of picture data, two types of steps of holding each of remaining pieces of picture data and the step of regarding the picture data A'(j), B'(j), each time the row number A is increased in increments of 1;

increasing the loop counting value k in increments of 1 in the range from 0 to $N/2^L-1$ to repeatedly performing the step of selecting an A-th row, the step of selecting a B-th row, two types of steps of transposing one or more pieces of picture data, two types of steps of holding each of remaining pieces of picture data, the step of regarding the picture data A'(j), B'(j) and the step of increasing the row number A, each time the loop counting value k is increased in increments of 1;

increasing the transposition mode L in increments of 1 in the range from L=1 to L=M to repeatedly performing the step of selecting an A-th row, the step of selecting a B-th row, two types of steps of transposing one or more pieces of picture data, two types of steps of holding each of remaining pieces of picture data, the step of regarding the picture data, the step of increasing the row number A and the step of increasing the loop counting value k, each time the transposition mode L is increased in increments of 1, a quasi-transposed picture image being formed in place of the intermediate picture image;

representing the picture data of the quasi-transposed picture image by E(i,j); and transposing the picture data E(i,j) of the quasi-transposed picture image according to an eighth equation $F(i, m*j+q)=E(i, m*(N-j-1)+q)$ in a column range of $0 \leq j \leq N-1$, a row range of $0 \leq i \leq N-1$ and a variable range of $0 \leq q \leq m-1$ to change the order of the picture data E(i,j) arranged in the same row in each of the rows, a destination picture image which is defined as a picture image obtained by rotating the multivalued source picture image 90 degrees in a clockwise direction being formed of the picture data F(i,j).

In the above steps, a maximum value M of a transposition mode L is calculated according to the first equation $M=\lceil \log_2 N \rceil$. The symbol [x] denotes a ceiling function of x. The transition mode L is increased in increments of 1 in an outer loop in the range from L=1 to L=M to transform a multivalued source picture image into a quasi-transposed picture image.

Thereafter, an A-th row having a row number A of which the picture data are transposed or held is selected according to a second equation $A=k*2^L$ on condition that a transposition mode L=1 and a loop counting value k=0 are initially set. Thereafter, the row number A is increased in increments of 1 in an inner loop in the range from $k*2^L$ to $k*2^L+2^{L-1}-1$. Also, the selection of the A-th row and the increase of the row number A are repeatedly performed each time the loop counting value k is increased in increments of 1 in a middle loop in the range from 0 to $N/2^L-1$. In addition, the selection of the A-throw and the increase of the row number A repeatedly performed while increasing the loop counting value k are repeatedly performed each time the transition mode L is increased in increments of 1 in the outer loop in the range from L=1 to L=M.

Thereafter, a B-th row having a row number B of which the picture data are transposed or held is selected according to a third equation $B=A+2^{L-1}$ each time the A-th row is selected.

Thereafter, each time the A-th row is selected, one or more picture data placed in the A-th row are transposed according to the fourth equation on condition the columns j are in the range from $p*m*2^L \leq j \leq p*m*2^L+m*2^{L-1}-1$. A variable p is increased from 0 to $N/2^L-1$ in increments of 1.

Also, each time the B-th row is selected, one or more picture data placed in the B-th row are transposed according to the fifth equation on condition the columns j are in the range from $p*m*2^L+m*2^{L-1} \leq j \leq p*m*2^L+m*2^L-1$. A variable p is increased from 0 to $N/2^L-1$ in increments of 1.

Also, each time the A-th row is selected, each of remaining picture data placed in the A-th row is held in the same row and column according to the sixth equation on condition the columns j are in the range from $p*m*2^L \leq j \leq p*m*2^L+m*2^{L-1}-1$. A variable p is increased from 0 to $N/2^L-1$ in increments of 1.

Also, each time the B-th row is selected, each of remaining picture data placed in the B-th row is held in the same row and column according to the seventh equation on condition the columns j are in the range from $p*m*2^L+m*2^{L-1} \leq j \leq p*m*2^L+m*2^L-1$. A variable p is increased from 0 to $N/2^L-1$ in increments of 1.

Thereafter, the picture data A'(j), B'(j) are regarded as pieces of picture data A(j), B(j) of an intermediate picture image each time the picture data A'(j), B'(j) are obtained. That is, the intermediate picture image is repeatedly renewed.

When the picture data A'(j), B'(j) are regarded as pieces of picture data A(j), B(J) after the transposition mode L is set to the maximum value M, a quasi-transposed picture image is formed in place of the intermediate picture image.

Thereafter, the;picture data E(i,j) of the quasi-transposed picture image are transposed according to the eighth equation to change the order of the picture data E(i,j) arranged in the same row in each of the rows.

Accordingly, a destination picture image consisting of pieces of picture data F(i,j) which is defined as a picture image obtained by rotating the multivalued source picture image 90 degrees in a clockwise direction can be formed.

Also, the first object is achieved by the provision of a method for rotating 90 degrees a multivalued source picture image consisting of pieces of picture data $a_{ij}$ (i=0,1, - - - ,N, j=0,1, - - - , m*N−1) arranged in a matrix of N rows×(m gradations*N) columns, comprising the steps of: determining a maximum value M of a transition mode L according to a first equation M=[$\log_2$N], the symbol [x] denoting a ceiling function of a constant x in which a value of [x] agrees with a value of the constant x when the constant x equals a positive integer or a value of [x] agrees with an integer determined by raising a decimal fraction of the constant x to a unit when the constant x has the decimal fraction;

numbering a series of rows of the multivalued source picture image from a 0-th row to an (N−1)-th row;

numbering a series of columns of the multivalued source picture image from a 0-th column to an (m*N−1)-th column;

initially setting the transition mode L to 1;

initially setting a loop counting value k to 0;

selecting an A-th row having a row number A according to a second equations A=k*$2^L$;

selecting a B-th row having a row number B according to a third equation B=A+$2^{L-1}$;

representing the picture data placed in the A-th row of the multivalued source picture image by A(j);

representing the picture data placed in the B-th row of the multivalued source picture image by B(j);

transposing one or more pieces of picture data placed in the A-th row according to a fourth equation B'(j)=A(j+ m*$2^{L-1}$) in a range of the columns p*m*$2^L$≦j≦p*m*$2^L$+m*$2^{L-1}$−1, a variable p being increased from 0 to N/$2^L$−1 in increments of 1;

transposing one or more pieces of picture data placed in the B-th row according to a fifth equation A'(j)=B(j− m*$2^{L-1}$) in a range of the columns p*m*$2^L$+m*$2^{L-1}$≦j≦p*m*$2^L$+m*$2^L$−1, a variable p being increased from 0 to N/$2^L$−1 in increments of 1;

holding each of remaining pieces of picture data placed in the A-th row at the same row and column according to a sixth equation A'(j)=A(J) in a range of the columns p*m*$2^L$≦j≦p*m*$2^L$+m*$2^L$−1, a variable p being increased from 0 to N/$2^L$−1 in increments of 1;

holding each of remaining pieces of picture data placed in the B-th row at the same row and column according to a seventh equation B'(j)=B(J) in a range of the columns p*m*$2^L$+m*$2^{L-1}$≦j≦p*m*$2^L$+m*$2^L$−1, a variable p being increased from 0 to N/$2^L$−1 in increments of 1;

regarding the picture data A'(j), B'(j) as pieces of picture data A(j), B(j) of an intermediate picture image;

increasing the row number A in increments of 1 in the range from k*$2^L$ to k*$2^L$+$2^{L-1}$−1 to repeatedly performing the step of selecting a B-th row, two types of steps of transposing one or more pieces of picture data, two types of steps of holding each of remaining pieces of picture data and the step of regarding the picture data A'(j), B'(j), each time the row number A is increased in increments of 1;

increasing the loop counting value k in increments of 1 in the range from 0 to N/$2^L$−1 to repeatedly performing the step of selecting an A-th row, the step of selecting a B-th row, two types of steps of transposing one or more pieces of picture data, two types of steps of holding each of remaining pieces of picture data, the step of regarding the picture data A'(j), B'(j) and the step of increasing the row number A, each time the loop counting value k is increased in increments of 1;

increasing the transposition mode L in increments of 1 in the range from L=1 to L=M to repeatedly performing the step of selecting an A-th row, the step of selecting a B-th row, two types of steps of transposing one or more pieces of picture data, two types of steps of holding each of remaining pieces of picture data, the step of regarding the picture data, the step of increasing the row number A and the step of increasing the loop counting value k, each time the transposition mode L is increased in increments of 1, a quasi-transposed picture image being formed in place of the intermediate picture image;

representing the picture data of the quasi-transposed picture image by E(i,j); and transposing the picture data E(i,j) of the quasi-transposed picture image according to an eighth equation G(i,j)= E(N−i−1,j) in a row range of 0≦i≦N−1 and a column range of 0≦j≦m*N−1 to change the order of the picture data E(i,j) arranged in the same column in each of the columns, a destination picture image which is defined as a picture image obtained by rotating the multivalued source picture image 90 degrees in a counterclockwise direction being formed of the picture data G(i,j).

In the above steps, a quasi-transposed picture image is formed in the same manner by repeatedly renewing an intermediate picture image of which pieces of picture data are transposed in the steps of one or more pieces of picture data.

Thereafter, the picture data E(i,j) of the quasi-transposed picture, image are transposed according to the eighth equation to change the order of the picture data E(i,j) arranged in the same column in each of the columns.

Accordingly, a destination picture image consisting of pieces of picture data G(i,J) which is defined as a picture image obtained by rotating the multivalued source picture image 90 degrees in a counterclockwise direction can be formed.

The second object is achieved by the provision of an apparatus for rotating 90 degrees a multivalued source picture , image consisting of pieces of picture data $a_{ij}$ (i=0,1, - - - ,N, j=0,1, - - - , m*N−1) arranged in a matrix of N rows×(m gradations*N) columns, comprising:

picture image storing means for storing a multivalued source picture image consisting of pieces of picture data $a_{ij}$ (i=0,1, - - - ,N, j=0,1, - - - , m*N−1) arranged in a matrix of N rows×(m gradations*N) columns;

transposition mode calculating means for calculating a maximum value M of a transposition mode L according to a first equation M=[$\log_2$N] by utilizing the number N of rows or columns of the multivalued source picture image stored in the picture image storing means, the symbol [x] denoting a ceiling function of a constant x in which a value of [x] agrees with a value of the constant x when the constant x equals a positive integer or a value of [x] agrees with an integer determined by raising a decimal fraction of the constant x to a unit when the constant x has the decimal fraction;

row selecting means for numbering a series of rows of the multivalued source picture image stored in the picture image storing means from a 0-th row to an (N−1)-th row, numbering a series of columns of the multivalued source picture image from a 0-th column to an (m*N−1)-th column, repeatedly selecting an A-th row having a row number A while increasing the row number A in increments of 1 in the range from a minimum value $k*2^L$ of the row number A to a maximum value $k*2^L+2^{L-1}-1$ of the row number A and increasing the loop counting value k in increments of 1 in the range from 0 to $N/2^L-1$ each time the transposition mode L is increased in increments of 1 in the range from L=1 to the maximum value M of the transposition mode L calculated in the transposition mode calculating means, and repeatedly selecting a B-th row having a row number B according to a second equation $B=A+2^{L-1}$ each time the A-th row is selected; picture image transforming means for representing the picture data placed in the A-th row of the multivalued source picture image by A(j) each time the A-th row is selected in the row selecting means, representing the picture data placed in the B-th row of tile multivalued source picture image by B(J) each time the B-th row is selected in the row selecting means, and transforming the multivalued source picture image to a quasi-transposed picture image by transposing one or more pieces of picture data placed in the A-th row according to a third equation $B'(J)=A(J+m*2^{L-1})$ in a range of the columns $p*m*2^L \leq j \leq p*m*2^L+m*2^{L-1}-1$ while increasing a variable p from 0 to $N/2^L-1$ in increments of 1, transposing one or more pieces of picture data placed in the B-th row according to a fourth equation $A'(j)=B(j-m*2^{L-1})$ in a range of the columns $p*m*2^L+m*2^{L-1} \leq j \leq p*m*2^L+m*2^L-1$ while increasing a variable p from 0 to $N/2^L-1$ in increments of 1, holding each of remaining pieces of picture data placed in the A-th row at the same row and column according to a fifth equation $A'(j)=A(j)$ in a range of the columns $p*m*2^L \leq j \leq p*m*2^L+m*2^{L-1}-1$ while increasing a variable p from 0 to $N/2^L-1$ in increments of 1, holding each of remaining pieces of picture data placed in the B-th row at the same row and column according to a sixth equation $B'(j)=B(j)$ in a range of the columns $p*m*2^L+m*2^{L-1} \leq j \leq p*m*2^L+m*2^L-1$ while increasing a variable p from 0 to $N/2^L-1$ in increments of 1, and regarding the picture data A'(j), B'(j) as pieces of picture data A(j), B(j) renewed each time the A-th row and the B-th row are selected in the row selecting means; and column order changing means for representing the picture data of the quasi-transposed picture image formed in the picture image transforming means by E(i,j), and transposing the picture data E(i,j) of the quasi-transposed picture image according to a seventh equation $F(i, m*j+q)=E(i, m*(N-j-1)+q)$ in a column range of $0 \leq j \leq N-1$, a row range of $0 \leq i \leq N-1$ and a variable range of $0 \leq q \leq m-1$ to change the order of the picture data E(i,j) arranged in the same row in each of the rows, a destination picture image which is defined as a picture image obtained by rotating the multivalued source picture image 90 degrees in a clockwise direction being formed of the picture data F(i,j).

In the above configuration, a maximum value M of a transposition mode L is calculated according to the first equation $M=[\log_2 N]$ in the transposition mode calculating means. The symbol [x] denotes a ceiling function of x.

Thereafter, an A-th row having a row number A of which the picture data are transposed or held is selected in the row selecting means. In detail, the row number A is set to $A=k*2^L$ on condition that a transposition mode L=1 and a loop counting value k=0 are initially set. Thereafter, the row number A is increased in increments of 1 in an inner loop in the range from $k*2^L$ to $k*2^L+2^{L-1}-1$. Also, the selection of the A-th row and the increase of the row number A are repeatedly performed each time the loop counting value k is increased in increments of 1 in a middle loop in the range from 0 to $N/2^L-1$. In addition, the selection of the A-th row and the increase of the row number A repeatedly performed while increasing the loop counting value k are repeatedly performed each time the transition mode L is increased in increments of 1 in an outer loop in the range from L=1 to L=M.

Also, a B-th row having a row number B of which the picture data are transposed or held is selected in the row selecting means according to a second equation $B=A+2^{L-1}$ each time the A-th row is selected.

Thereafter, the multivalued source picture image is transformed to a quasi-transposed picture image by transposing the picture data of the A-th row and the B-th row each time the A-th row and the B-th row are selected in the row selecting means. In detail, one or more picture data placed in the A-th row are transposed in the picture image transforming means according to the third equation on condition the columns j are in the range from $p*m*2^L \leq j \leq p*m*2^L+m*2^{L-1}-1$. A variable p is increased from 0 to $N/2^L-1$ in increments of 1. Also, one or more picture data placed in the B-th row are transposed according to the fourth equation on condition the columns j are in the range from $p*m*2^L+m*2^{L-1} \leq j \leq p*m*2^L+m*2^L-1$. A variable p is increased from 0 to $N/2^L-1$ in increments of 1. Also, each of remaining picture data placed in the A-th row is held in the same row and column according to the fifth equation on condition the columns j are in the range from $p*m*2^L \leq j \leq p*m*2^L+m*2^{L-1}-1$. A variable p is increased from 0 to $N/2^L-1$ in increments of 1. Also, each of remaining picture data placed in the B-th row is held in the same row and column according to the sixth equation on condition the columns j are in the range from $p*m*2^L+m*2^{L-1} \leq j \leq p*m*2^L+m*2^L-1$. A variable p is increased from 0 to $N/2^L-1$ in increments of 1.

Thereafter, the picture data A'(j), B'(j) are regarded as pieces of renewed picture data A(j), B(j) in the picture image transforming means ! each time the picture data A'(j), B'(j) are obtained.

Thereafter, the picture data E(i,j) of the quasi-transposed picture image are transposed in the column order changing means according to the seventh equation to change the order of the picture data E(i,j) arranged in the same row in each of the rows.

Accordingly, a destination picture image consisting of pieces of picture data F(i,J) which is defined as a picture image obtained by rotating the multivalued source picture image 90 degrees in a clockwise direction can be formed.

Also, the second object is achieved by the provision of an apparatus for rotating 90 degrees a multivalued source picture image consisting of pieces of picture data $a_{ij}$ (i=0,1, - - - ,N, j=0,1, - - - , m*N−1) arranged in a matrix of N rows×(m gradations*N) columns, comprising: picture image storing means for storing a multivalued source picture image consisting of pieces of picture data $a_{ij}$ (i=0,1, - - - ,N, j=0,1, - - - , m*N−1) arranged in a matrix of N rows×(m gradations*N) columns;

transposition mode calculating means for calculating a maximum value M of a transposition mode L according to a first equation $M=[\log_2 N]$ by utilizing the number N of rows or columns of the multivalued source picture image stored in the picture image storing means, the symbol [x] denoting a ceiling function of a constant x in which a value of [x] agrees with a value of the constant x when the constant x equals a positive integer or a value of [x] agrees with an integer determined by raising a decimal fraction of the constant x to a unit when the constant x has the decimal fraction;

row selecting means for numbering a series of rows of the multivalued source picture image stored in the picture image storing means from a 0-th row to an (N−1)-th row, numbering a series of columns of the multivalued source picture image from a 0-th column to an (m*N−1)-th column, repeatedly selecting an A-th row having a row number A while increasing the row number A in increments of 1 in the range from a minimum value $k*2^L$ of the row number A to a maximum value $k*2^L+2^{L-1}-1$ of the row number A and increasing the loop counting value k in increments of 1 in the range from 0 to $N/2^L-1$ each time the transposition mode L is increased in increments of 1 in the range from L=1 to the maximum value M of the transposition mode L calculated in the transposition mode calculating means, and repeatedly selecting a B-th row having a row number B according to a second equation $B=A+2^{L-1}$ each time the A-th row is selected; picture image transforming means for representing the picture data placed in the A-th row of the multivalued source picture image by A(j) each time the A-th row is selected in the row selecting means, representing the picture data placed in the B-th row of the multivalued source picture image by B(j) each time the B-th row is selected in the row selecting means, and transforming the multivalued source picture image to a quasi-transposed picture image by transposing one or more pieces of picture data placed in the A-th row according to a third equation $B'(j)=A(j+m*2^{L-1})$ in a range of the columns $p*m*2^L \leq j \leq p*m*2^L+m*2^{L-1}-1$ while increasing a variable p from 0 to $N/2^L-1$ in increments of 1, transposing one or more pieces of picture data placed in the B-th row according to a fourth equation $A'(j)=B(j-m*2^{L-1})$ in a range of the columns $p*m*2^L+m*2^{L-1} \leq j \leq p*m*2^L+m*2^L-1$ while increasing a variable p from 0 to $N/2^L-1$ in increments of 1, holding each of remaining pieces of picture data placed in the A-th row at the same row and column according to a fifth equation $A'(j)=A(j)$ in a range of the columns $p*m*2^L \leq j \leq p*m*2^L+m*2^{L-1}-1$ while increasing a variable p from 0 to $N/2^L-1$ in increments of 1, holding each of remaining pieces of picture data placed in the B-th row at the same row and column according to a sixth equation $B'(j)=B(j)$ in a range of the columns $p*m*2^L+m*2^{L-1} \leq j \leq p*m*2^L+m*2^L-1$ while increasing a variable p from 0 to $N/2^L-1$ in increments of 1, and regarding the picture data A'(j), B'(j) as pieces of picture data A(j), B(j) renewed each time the A-th row and the B-th row are selected in the row selecting means; and row order changing means for representing the picture data of the quasi-transposed picture image formed in the picture image transforming means by E(i,j), and transposing the picture data E(i,j) of the quasi-transposed picture image according to a seventh equation $G(i,j)=E(N-i-1,j)$ in a row range of $0 \leq i \leq N-1$ and a column range of $0 \leq j \leq m*N-1$ to change the order of the picture data E(i,j) arranged in the same column in each of the rows, a destination picture image which is defined as a picture image obtained by rotating the multivalued source picture image 90 degrees in a counterclockwise direction being formed of the picture data G(i,j).

In the above configuration, a quasi-transposed picture image is formed in the same manner by repeatedly renewing the picture data.

Thereafter, the picture data E(i,j) of the quasi-transposed picture image are transposed in the row order changing means according to the seventh equation to change the order of the picture data E(i,j) arranged in the same column in each of the columns.

Accordingly, a destination picture image consisting of pieces of picture data G(i,j) which is defined as a picture image obtained by rotating the multivalued source picture image 90 degrees in a counterclockwise direction can be formed.

BRIEF DESCRIPTION OF THE DRAWINGS

The objects, features and advantages of the present invention will be apparent from the following description taken in conjunction with the accompanying drawings, in which:

FIGS. 1(a) to 1(c) shows a first conventional method in which pieces of multivalued picture data arranged in a matrix of 4 rows×(2 gradations*4) columns are rotated 90 degrees in a clockwise direction according to a phase-1 step to a phase-17 step;

FIG. 6(a) shows a multivalued source picture image expressed by a matrix of 4 rows×(2 gradations*4) columns;

FIGS. 6(b) to 6(d) respectively shows an intermediate picture image formed according to a phase-1, a phase-2 or a phase-3 procedure;

FIG. 6(e) shows a quasi-transposed picture image formed according to a phase-4 procedure;

FIG. 6(f) shows a first destination picture image formed according to a phase-5 procedure; and FIG. 6(g) shows a second destination picture image formed according to a phase-6 procedure.

DETAIL DESCRIPTION OF THE PREFERRED EMBODIMENTS

Figures 2A, 2B:
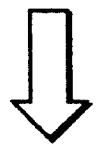
FIGS. 2(a) to 2(f) show a forming method of a quasi-transposed picture image T which is obtained by transforming a source picture image $S=\{a_{ij}\}$ consisting of pieces of picture data $a_{ij}$ arranged in a matrix of 8 rows×(4 gradations*8) columns.

Preferred embodiments of a rotating method and a rotating apparatus of a multivalued picture image consisting of pieces of multivalued picture data arranged in a matrix of N rows×(m gradations*N) columns by 90 degrees according to the present invention are described with reference to drawings.

The concept of the present invention is briefly described.

A multivalued source picture image expressed by a matrix of N rows×(m gradations*N) columns is prepared. Each of rows consists of m×N bits because a picture graded in m types of gradations is displayed in each of pixels, and the multivalued source picture image has pieces of picture data $a_{ij}$ (i=0,1, - - - ,N−1, j=0,1, N×m−1). That is, the multivalued source picture image has a series of rows numbered from a 0-th row (for the first row) to an (N−1)-th row (for the final row), and the multivalued source picture image has a series of columns numbered from a 0-th column (for the first column) to an (N×m−1)-th column (for the final column). Therefore, the symbol i denotes the numbers of the bits in each of the columns, and the symbol j denotes the numbers of the bits in each of the rows.

To form a quasi-transposed picture image obtained by transposing the picture data $a_{ij}$ of the multivalued source picture image in m pieces of picture data of tile same pixel, a maximum value M of a transposition mode L is initially calculated according to an equation (1).

$$M=[\log_2 N] \qquad (1)$$

Here the symbol [x] denotes a ceiling function of x. That is, when a constant x (x>0) is a positive integer, the value of [x] agrees with the positive integer. When the constant x has a decimal fraction, the value of [x] agrees with an integer determined by raising the decimal fraction to a unit. Therefore, the transposition mode L ranges from 1 to M (1≤L≤M). For example, the multivalued source picture image is transformed to an intermediate picture image in a transposition mode L=1. Also, the intermediate picture image is repeatedly transformed to a succeeding intermediate picture image in succeeding transition modes L (2≤L≤M−1). The intermediate picture image finally formed is transformed to a quasi-transposed picture image in a transposition mode L=M.

Thereafter, a row number A of an A-th row and a row number B of a B-th row in the multivalued source picture image are selected to exchange one or more pieces of picture data placed in the A-th row for other picture data placed in the B-th row according to equations (2), (3), (4) and (5).

$$A=k*2^L \qquad (2)$$

$$B=A+2^{L-1} \qquad (3)$$

$$k=0 \qquad (4)$$

$$L=1 \qquad (5)$$

Thereafter, the picture data placed in the A-th row of the multivalued source picture image are represented by a symbol A(j), and the picture data placed in the B-th row of the multivalued source picture image are represented by another symbol B(j). Also, the picture data placed in the A-th row of an intermediate picture image are represented by a symbol A'(j), and the picture data placed in the B-th row of the intermediate picture image are represented by another symbol B'(j). In this case, the picture data A'(j), B'(j) of the intermediate picture image are calculated according to equations (6) to (13).

$$A'(j)=A(j) \qquad (6)$$

$$p*m*2^L \leq j \leq p*m*2^L+m*2^{L-1}-1 \qquad (7)$$

$$A'(j)=B(j-m*2^{L-1}) \qquad (8)$$

$$p*m*2^L+m*2^{L-1} \leq j \leq p*m*2^L+m*2^L-1 \qquad (9)$$

$$B'(j)=B(j) \qquad (10)$$

$$p*m*2^L+m*2^{L-1} \leq j \leq p*m*2^L+m*2^L-1 \qquad (11)$$

$$B'(j)=A(j+m*2^{L-1}) \qquad (12)$$

$$p*m*2^L \leq j \leq p*m*2^L+m*2^{L-1}-1 \qquad (13)$$

Here the range of a variable p is indicated by an equation (14).

$$0 \leq p \leq N/2^L-1 \qquad (14)$$

That is, when p=0 is satisfied, the picture data A'(j), B'(j) are calculated according to the equations (6), (8), (10) and (12) on condition that the numbers j of the bits in the A-th and B-th rows satisfy the equations (7), (9), (11) and (13). Thereafter, the variable p is increased in increments of 1, and the picture data A'(J), B'(j) are calculated according to the equations (6) to (13) in the same manner each time the variable p is increased. The increment of the variable p is continued on condition that the equation (14) is satisfied. As a result, one or more pieces of picture data placed in the A-th row of the source picture image are exchanged for other picture data placed in the B-th row of the source picture image.

Thereafter, the row number A of the A-th row is increased in increments of 1, and the row number B of the B-th row is increased according to the equation (3). Thereafter, one or more pieces of picture data placed in the A-th row of the source picture image are exchanged for other picture data placed in the B-th row of the source picture image according to the equations (4) to (14). The increment of the row number A of the A-th row is continued on condition that an equation (15) is satisfied.

$$k*2^L \leq A \leq k*2^L+2^{L-1}-1 \qquad (15)$$

Thereafter, the loop counting value k is increased in increments of 1 to select the A-th row and the B-th row according to the equations (2), (3) and (5) each time the loop counting value k is increased and to exchange one or more pieces of picture data placed in the A-th row of the source picture image for other picture data placed in the B-th row of the source picture image according to the equations (6) to (14) each time the A-th row and the B-th row are selected. The increment of the loop counting value k is continued on condition that an equation (16) is satisfied.

$$0 \leq k \leq N/2^L-1 \qquad (16)$$

Therefore, the multivalued source picture image is transformed to an intermediate picture image.

Thereafter, the transposition mode L is increased in increments of 1, and one or more pieces of picture data placed in the A-th row of the intermediate picture image are exchanged for other picture data placed in the B-th row of the intermediate picture image according to the equations (2) to (4), and (6) to (16) to form a succeeding intermediate picture image each time the transposition mode L is increased. The increment of the transposition mode L is continued on condition that an equation (17) is satisfied.

$$1 \leq L \leq M \qquad (17)$$

As a result, the multivalued source picture image is transformed to a quasi-transposed picture image by repeatedly transposing the picture data $a_{ij}$ of the multivalued source picture image and the picture data of the intermediate matrices.

Thereafter, a piece of picture data of the quasi-transposed picture image placed at an i-th row and a j-th column is represented by E(i,j), and pieces of picture data E(i,j) are transposed according to equations (18) to (20) to form a first destination picture image which is defined as a picture image obtained by rotating the source picture image 90 degrees in a clockwise direction.

$$F(i, m*j+q)=E(i, m*(N-j-1)+q) \qquad (18)$$

$$0 \leq j \leq N-1 \qquad (19)$$

$$q=0 \qquad (20)$$

Here F(i,j) denotes a piece of picture data of the first destination picture image placed in a j-th column and a i-th row.

That is, the picture data F(i,j) are initially calculated according to the equations (18) and (20) in case of j=0. Thereafter, the bit number j of the column is increased in increments of 1, and the picture data F(i,j) are calculated according to the equations (18) and (20) each time the number j is increased. The increment of the bit number j is continued on condition that the equation (19) is satisfied.

Thereafter, a variable q is increased in increments of 1, and the picture data F(i,j) are calculated according to the equations (18) and (19) in the same manner each time the variable q is increased. The increment of the variable q is continued on condition that an equation (21) is satisfied.

$$0 \leq q \leq m-1 \qquad (21)$$

As a result, the first destination picture image is formed.

In contrast, the element E(i,j) of the quasi-transposed picture image is transposed according to equations (22) to (24) to form a second destination picture image which is defined as a picture image obtained by rotating the multi-valued source picture image 90 degrees in a counterclockwise direction.

$$G(i,j)=E(N-i,j) \qquad (22)$$

$$0 \leq i \leq N-1 \qquad (23)$$

$$0 \leq j \leq m*N-1 \qquad (24)$$

Here G(i, j) denotes a piece of picture data of the second destination picture image placed at an i-th row and a j-th column.

As a result, the second destination picture image is formed.

Next, transposition of pieces of picture data arranged in a matrix of 8 rows×(4 gradations*8) columns is described with reference to FIGS. 2(a) to 2(f) to clarify the reason that the equations (1) to (17) are utilized to determine the quasi-transposed picture image.

FIGS. 2(a) to 2(f) show a forming method of a quasi-transposed picture image T which is obtained by transforming a source picture image S={$a_{ij}$} consisting of pieces of picture data $a_{ij}$ arranged in a matrix of 8 rows×(4 gradations*8) columns.

A matrix of a source picture image S={$a_{ij}$} (i=0,1, - - - ,7, j=0,1, - - - ,31) shown in FIG. 2(a) is rewritten to S={$A_{ig}$} in which a 1×4 small block $A_{ig}$ is expressed by $A_{ig}$={$a_{i.4g}$, $a_{i.4g+1}$, $a_{i.4g+2}$, $a_{i.4g+3}$} (g=0,1, - - - ,7).

The small block $A_{ig}$ of the source picture image S shown in FIG. 2(a) is exchanged for the small block $A_{i+1.g-1}$ in a mode 1 on condition that the row number i is zero or an even number and a block-column number g is an odd number. Therefore, as shown in FIG. 2(b), a first intermediate picture image $S_1$={$b_{ij}$}={$B_{ig}$} is formed. Here a 1×4 small block $B_{ig}$ is expressed by $B_{ig}$={$b_{i.4g}$, $b_{i.4g+1}$, $b_{i.4g+2}$, $b_{i.4g+3}$}.

Figures 2C, 2D:
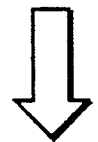

Thereafter, the small block $B_{ig}$ of the first intermediate picture image $S_1$ shown in FIG. 2(c) is exchanged for the small block $B_{i+2.g-2}$ in a mode 2 on condition that i=0,1,4, or 5 and g=2,3,6, or 7 are satisfied. Therefore, as shown in FIG. 2(d), a second intermediate picture image $S_2$={$c_{ij}$}={$C_{ig}$} is formed. Here a 1×4 small block $C_{ig}$ is expressed by $C_{ig}$={$C_{i.4g}$, $C_{i.4g+1}$, $C_{i.4g+2}$, $C_{i.4+3}$}.

Figures 2E, 2F:
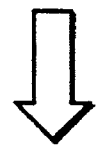

Thereafter, the small block $C_{ig}$ of the second intermediate picture image $S_2$ shown in FIG. 2(e) is exchanged for the small block $C_{i+4.g-4}$ in a mode 3 on condition that i=0,1,2 or 3 and j=4,5,6 or 7 are satisfied. Therefore, as shown in FIG. 2(f), an quasi-transposed picture image T={$d_{ij}$} is obtained. In this case, a matrix of the quasi-transposed picture image T={$b_{ij}$} can be rewritten to T={$^tA_{ig}$}={$A_{gi}$}. Therefore, an destination picture image obtained by rotating the source picture image S 90 degrees in a clockwise direction or a counterclockwise direction can be formed by processing the quasi-transposed picture image T according to the equations (18), (19) and (21) or the equations (22) to (24).

The reason that the maximum value M of the transposition mode L is calculated according to the equation (1) is described.

In the mode 1 (L=1), a 1×1 ($2^L/2×2^L/2$) type of small block $A_{ig}$ is exchanged for another small block $A_{i+1.g-1}$ in a partial picture image composed of 4 types of small blocks $A_{i.g-1}$, $A_{ig}$, $A_{i+1.g-1}$, and $A_{i+1.g}$. Therefore, 16 types of quasi-transposed picture images respectively having 2 (=$2^L$) rows×(m gradations*2) columns can be generally formed. In the mode 2 (L=2), 2×2 ($2^L/2×2^L/2$) types of small blocks $B_{ig}$, $B_{i.g+1}$, $B_{i+1.g}$, and $B_{i+1.g+1}$ are exchanged for other small blocks $B_{i+2.g-2}$, $B_{i+2.g-1}$, $B_{i+3.g-2}$, and $B_{i+3.g-1}$ in a partial picture image composed of 16 types of small blocks. Therefore, 4 types of quasi-transposed picture images respectively having 4 (=$2^L$) rows×(m gradations*4) columns can be generally formed. In the mode 3 (L=3), 4×4 ($2^L/2×2^L/2$) types of small blocks are exchanged for other 16 types of small blocks in a picture image composed of 64 types of small blocks. Therefore, a quasi-transposed picture image having 8 (=$2^M$) rows×(m gradations*8) columns can be generally formed.

Accordingly, in cases where a source picture image having N (=$2^M$) rows×(m gradations*N) columns is transformed to a quasi-transposed picture image, the exchanges of 1×1, 2×2, 4×4, 8×8, - - - , 2M/2×2M/2 small blocks (L=1,2,3, - - - ,M) are required in that order. Therefore, the number of the exchanges required can be calculated according to the equation (1).

The reason that the equations (2), (3), (4), (15) and (16) are utilized is described.

In cases where a source picture image having N rows 33 (m gradations*N) columns is transformed to a quasi-transposed picture image, the row number of the A-th row positioned at a highest row in each of the partial picture images is 0 (=k*$2^L$, k=0), 2 (=k*$2^L$, k=1), 4 (=k*$2^L$, k=2), 6 (=k*$2^L$, k=3), - - - , N−2 (=N−$2^L$) in the mode 1 (L=1). The row number of the A-th row positioned at a highest row in each of the partial picture images is 0 (=k*$2^L$, k=0), 4 (=k*$2^L$, k=1), 8 (=k*$2^L$, k=2), - - - , N−4 (=N−$2^L$) in the mode 2 (L=2). The row number of the A-th row positioned at a highest row in each of the partial picture images is 0 (=k*$2^L$, k=0), 8 (=k*$2^L$, k=1), - - - , N−8 (=N−$2^L$) in the mode 3 (L=3). Therefore, the row number of the A-th row which is positioned at a highest row in the partial picture image placed at lowest rows is N−$2^L$ (=(N/$2^L$−1)×$2^L$) in the mode L.

Accordingly, in cases where the range of the loop counting value k is formulated by the equation (16), the row numbers of the A-th rows to be selected can be formulated by the equation (15) because N−$2^L$=k*$2^L$ is satisfied when k=N/$2^L$−1.

Also, as shown in FIGS. 2(a), 2(c), 2(e), the number of A-th rows or B-th rows selected in the same partial picture image to exchange pieces of picture data placed in the A-th rows for other picture data placed in the B-th rows is 1 in the mode 1 (L=1), 2 in the mode 2 (L=2) and 4 in the mode 3 (L=3). Therefore, the number of A-th rows or B-th rows selected in the same partial picture image is generally $2^{L-1}$ in the mode L.

Accordingly, because the row numbers of the B-th rows to be selected can be obtained by adding $2^{L-1}$ to the row numbers of the A-th rows selected, the equation (3) holds.

The reason that the equations (6) to (14) are utilized is described.

The selection of the numbers of the columns at which the picture data of a picture image to be transposed are placed is performed in the same manner as the selection of the A-th rows and the B-th rows. Therefore, when the concept of the gradation is added to the selection of the column numbers, the equations (6) to (14) hold.

Next, a rotating apparatus according to an embodiment of the present invention is described.

Figure 3:
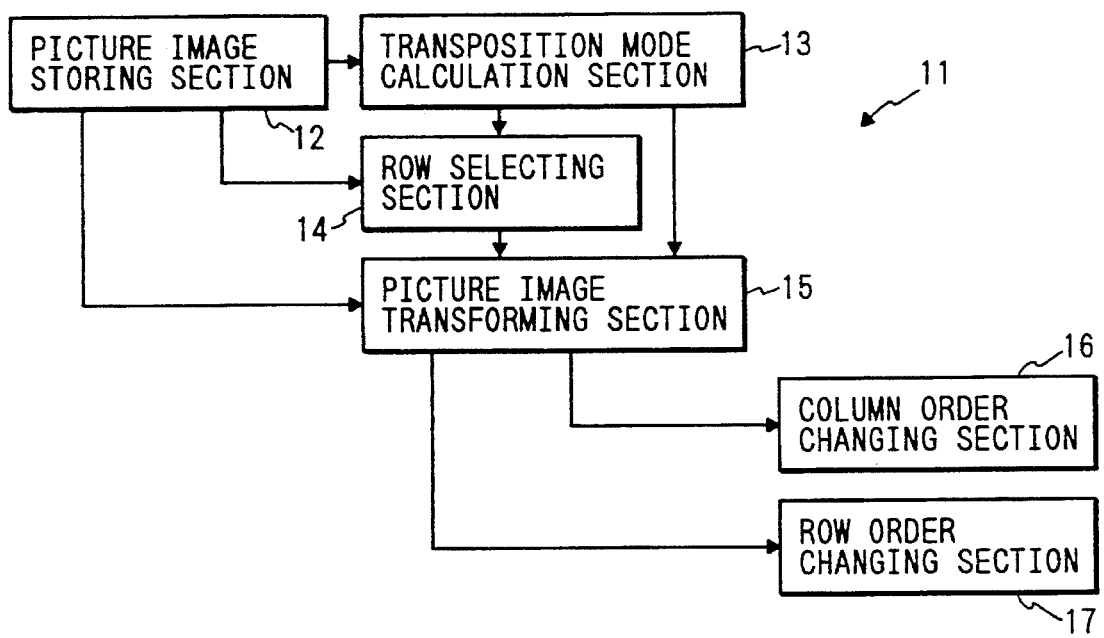
FIG. 3 is a block diagram of a rotating apparatus in which a multivalued source picture image consisting of pieces of multivalued picture data arranged in a matrix of N rows×(m gradations*N) columns are rotated 90 degrees.

FIG. 3 is a block diagram of a rotating apparatus in which a multivalued source picture image consisting of pieces of multivalued picture data arranged in a matrix of N rows×(m gradations*N) columns are rotated 90 degrees.

As shown in FIG. 3, a rotating apparatus 11 comprises a picture image storing section 12 for initially storing a multivalued source picture image consisting of a plurality of pieces of multivalued source picture data arranged in a matrix of N rows×(m gradations*N) columns, a transposition mode calculating section 13 for calculating a maximum value M of a transposition mode L according to the equation (1), a row selecting section 14 for selecting the A-th row numbered by the row number A in the multivalued source picture image or one of intermediate picture images and the B-th row numbered by the row number B to exchange one or more picture data placed in the A-th row for other picture data placed in the B-th row according to the transposition mode L, a picture image transforming section 15 for transforming the multivalued source picture image to a quasi-transposed picture image by repeatedly exchanging the picture data placed in the A-th row for the picture data placed in the B-th row, a column order changing section 16 for changing the order of the picture data arranged in the same row to form a first destination picture image obtained by rotating the multivalued source picture image 90 degrees in a clockwise direction, and a row order changing section 17 for changing the order of the picture data arranged in the same column to form a second destination picture image obtained by rotating the multivalued source picture image 90 degrees in a counterclockwise direction.

In the above configuration, a multivalued source picture image consisting of a plurality of pieces of picture data is stored in the picture image storing section 12. The multivalued source picture data are arranged in a matrix of N rows×(m gradations*N) columns. Each of the rows of the multivalued source picture image is composed of N×m bits because each of pixels has m types of gradations, and the picture data of the multivalued source picture image are indicated by $a_{ij}$ (i=0,1, - - - ,N−1, j=0,1,N×m−1).

Thereafter, a maximum value M of a transposition mode L is calculated in the transposition mode calculating section 13 according to the equation (1). The transposition mode L is initially set to 1 and is increased in increments of 1 until the value L reaches the maximum value M. For example, the multivalued source picture image is changed to an intermediate picture image in a transposition mode L=1, and the intermediate picture image is repeatedly changed to a succeeding intermediate picture image in succeeding transposition modes L ($2 \leq L \leq M-1$). The intermediate picture image finally formed is changed to an quasi-transposed picture image in a transposition mode L=M.

Thereafter, a row number A of an A-th row and a row number B of a B-th row in the multivalued source picture image or one of the intermediate picture image are selected in each of the transposition mode L in the row selecting section 14 according to the equations (3), and (15) to (17).

Thereafter, one or more picture data placed in the A-th row are exchanged for other picture data placed in the B-th row in each of the transposition mode L in the picture image transforming section 15 according to the equations (6) to (14). Therefore, the quasi-transposed picture image is formed.

Thereafter, the order of the picture data arranged in the same row is changed in the column order changing section 16 according to the equations (18), (19) and (21), so that the quasi-transposed picture image is transformed to a first destination picture image which is defined as a picture image obtained by rotating the multivalued source picture image 90 degrees in a clockwise direction.

Also, the order of the picture data arranged in the same column is changed in the row order changing section 17 according to the equations (22) to (24), so that the quasi-transposed picture image is transformed to a second destination picture image which is defined as a picture image obtained by rotating the multivalued source picture image 90 degrees in a counterclockwise direction.

Accordingly, because the multivalued source picture image can be transformed to the first or second destination picture image, the multivalued source picture image can be rotated 90 degrees.

A method and an apparatus for rotating a multivalued picture image 90 degrees are described in detail with reference to FIGS. 4 to 6.

Figure 4:
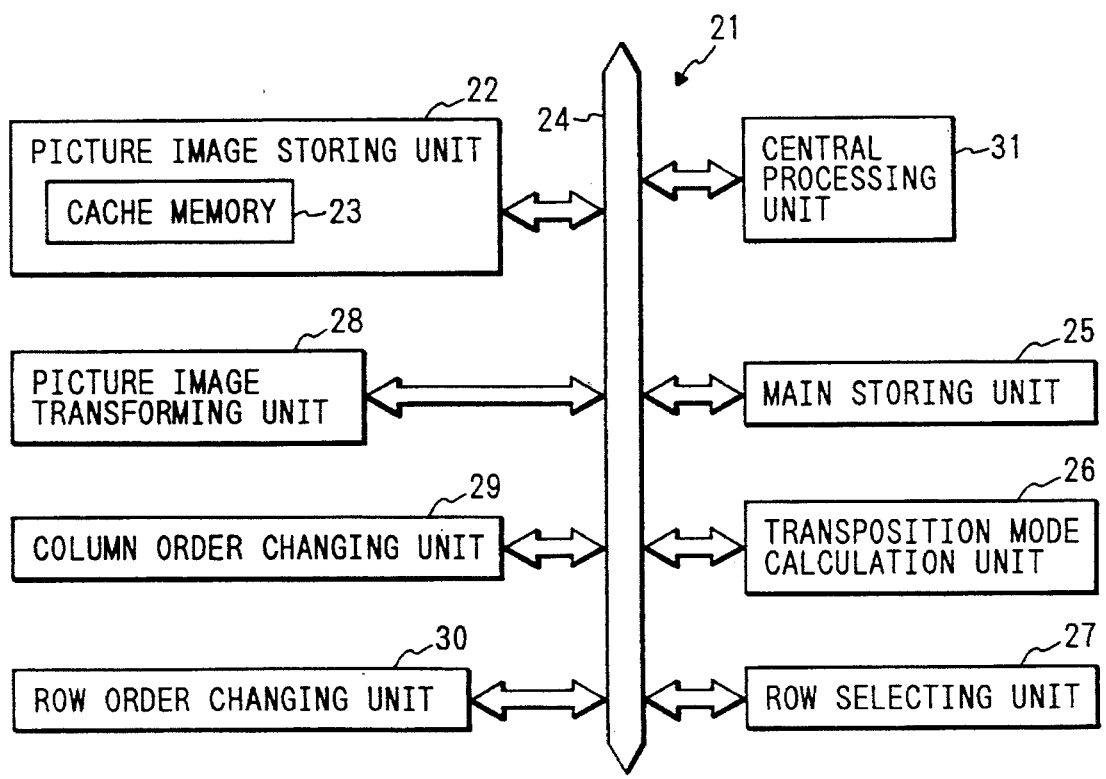
FIG. 4 shows a hardware configuration of an apparatus for rotating a multivalued source picture image 90 degrees.

FIG. 4 shows a hardware configuration of an apparatus for rotating a multivalued source picture image 90 degrees.

As shown in FIG. 4, a multivalued source picture image rotating apparatus 21 comprises a picture image storing unit 22 having a cache memory 23 for initially storing a multivalued source picture image which is transferred from an external input-outpost unit through a bus 24 to the cache memory 23 and consists of a plurality of pieces of picture data arranged in a matrix of N rows×(m gradations*N) columns, a main storing unit 25 for storing a control program utilized to rotate a multivalued source picture image 90 degrees in a clockwise direction or a counterclockwise direction, a piece of rotation data designating the rotation of the multivalued source picture image in a clockwise direction or a counterclockwise direction, and various types of data such as the number N of the rows or columns, the number m of the gradations, the number L of a transposition mode, a maximum value M of the transposition mode L, a loop counting value k and a variable p, a transposition mode calculating unit 26 for calculating the maximum value M of the transposition mode L according to the equation (1), a row selecting unit 27 for selecting an A-th row of the source picture image or one of intermediate picture images numbered by the row number A and a B-th row numbered by the row number B, a picture image transforming unit 28 for transforming the multivalued source picture image to a quasi-transposed picture image by repeatedly exchanging one or more picture data placed in the A-th row for other picture data placed in the B-th row according to the transposition mode L, a column order changing unit 29 for changing the order of the picture data arranged in the same row of the quasi-transposed picture image to form a first destination picture image obtained by rotating the multivalued source picture image 90 degrees in a clockwise direction, a row order changing unit 30 for changing the order of the picture data arranged in the same column of the quasi-transposed picture image to form a second destination picture image obtained by rotating the multivalued source picture image 90 degrees in a counterclockwise direction, and a central processing unit 31 for controlling the operations in the units 22, and 25 to 30.

In the above configuration, a method for rotating 90 degrees a multivalued source picture image consisting of pieces of picture data in a matrix of 4 rows×(2 gradations*4) columns is described with reference to FIGS. 5, 6.

Figure 5:
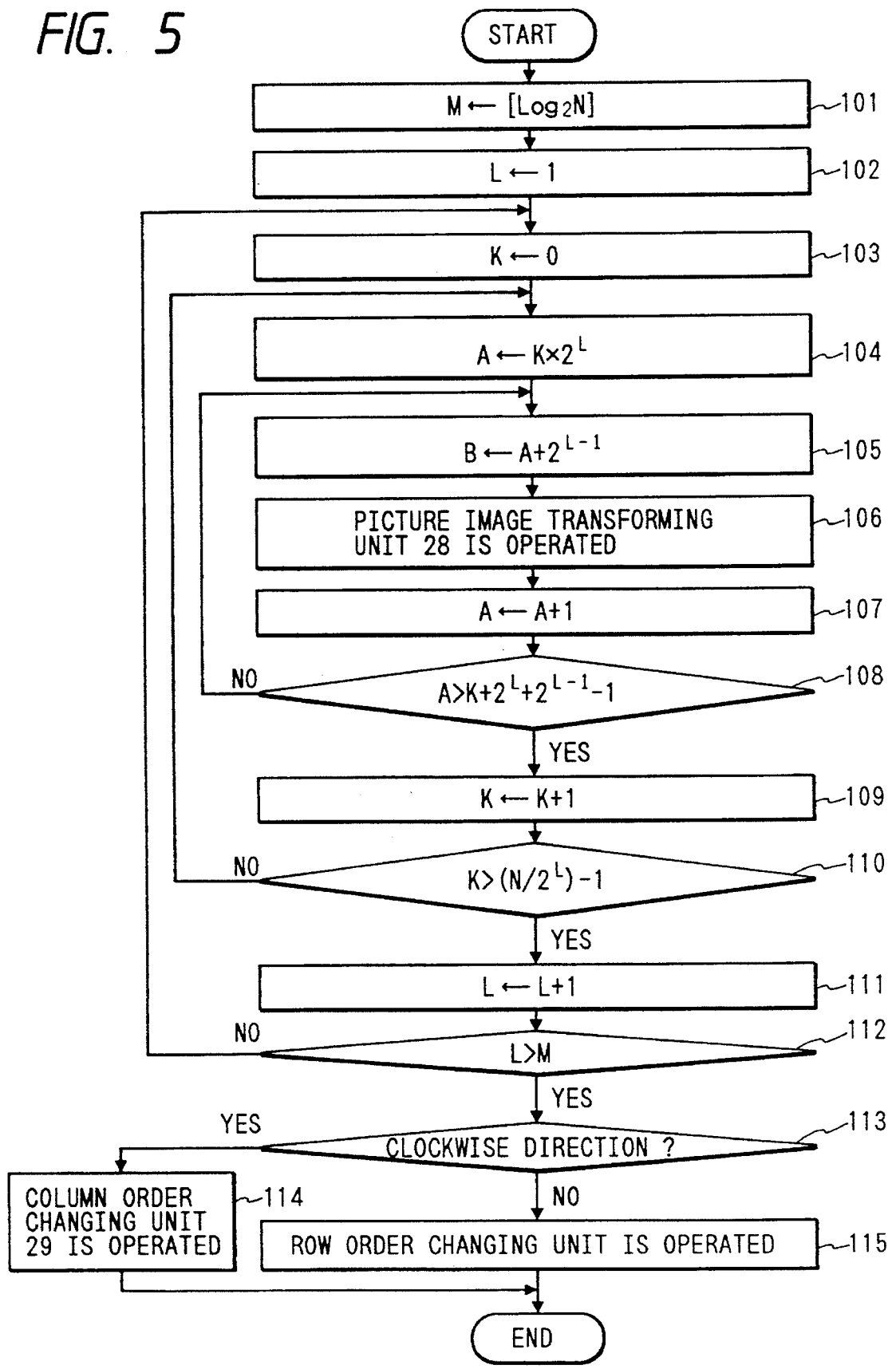
FIG. 5 is a flow chart showing a method for rotating a multivalued source picture image 90 degrees in the apparatus shown in FIG. 4.

FIG. 5 is a flow chart showing a method for rotating a multivalued source picture image 90 degrees in the apparatus shown in FIG. 4. FIG. 6(a) shows a multivalued source picture image expressed by a matrix of 4 rows×(2 gradations*4) columns. FIGS. 6(b) to 6(d) respectively shows an intermediate picture image formed according to a phase-1, a phase-2 or a phase-3 procedure. FIG. 6(e) shows a quasi-transposed picture image formed according to a phase-4 procedure. FIG. 6(f) shows a first destination picture image formed according to a phase-5 procedure. FIG. 6(g) shows a second destination picture image formed according to a phase-5 procedure.

After a multivalued source picture image consisting of a plurality of pieces of picture data of 4 rows×(2 gradations * 4) columns shown in FIG. 6(a) is stored in the picture image storing unit 22, a maximum value M of a transposition mode L is calculated in a step 1 according to the equation (1) in the transposition mode calculating unit 26. Because the number of the rows N=4 is satisfied, the maximum value M=2 is obtained. Therefore, two types of transposition modes L=1 and L=2 are executed in the rotating apparatus 21.

Thereafter, a transposition mode L=1 is initially set in a step 102, and a loop counting value k=0 is initially set in a step 103.

In a step 104, an A-th row of which one or more picture data are transposed is selected in the row selecting unit 27. In detail, the A-th row numbered by the row number A=0 is initially selected according to the equation (2) because of k=0 and L=1.

In a step 105, a B-th row of which one or more picture data are exchanged for the picture data of the A-th row is selected in the row selecting unit 27. In detail, the B-th row numbered by the row number B=i is initially selected according to the equation (3). The row numbers A, B are stored in the main storing unit 25.

In a step 106, the operation in the picture image transforming unit 28 is started under the control of the central processing unit 31 when the row numbers A, B are selected in the row selecting unit 27. That is, the picture data which are placed in the A-th row A=0 and the B-th row (B=1) of the multivalued source picture image stored in the picture image storing unit 22 are transferred from the picture image storing unit 22 to the picture image transforming unit 28. Thereafter, the picture data A(j) placed in the A-th row (A=0) are transposed to the B-th row (B=1) according to the equations (12), (13) and (14) or are respectively held in the same row and column according to the equations (6), (7) and (14). Also, the picture data B(j) placed in the B-th row (B=1) are transposed to the A-th row (A=0) according to the equations (8), (9) and (14) or are respectively held in the same row and column according to the equations (10), (11) and (14).

For example, because m=2, L=1 and N=4 are satisfied, the picture data $A(0)=0_1$, $A(1)=0_2$ are respectively held in the same row and column according to the equations (6), (7) when p=0, the picture data $A(2)=1_1$, $A(3)=1_2$ are transposed to B'(0), B'(1) according to the equations (12), (13) when p=0, the picture data $B(0)=4_1$, $B(1)=4_2$ are transposed to A'(2), A'(3) according to the equations (8), (9) when p=0, and the picture data $B(2)=5_1$, $B(3)=5_2$ are respectively held in the same row and column according to the equations (10), (11) when p=0. When p=1 is satisfied, the picture data $A(4)=2_1$, $A(5)=2_2$ are respectively held in the same row and column according to the equations (6), (7), the picture data $A(6)=3_1$, $A(7)=3_2$ are transposed to B'(4), B'(5) according to the equations (12), (13), the picture data $B(4)=6_1$, $B(5)=6_2$ are transposed to A'(6), A'(7) according to the equations (8), (9), and the picture data $B(6)=7_1$, $B(7)=7_2$ are respectively held in the same row and column according to the equations (10), (11).

The picture data A'(j), B'(j) are stored in the picture image storing unit 22 as the picture data A(j), B(j) newly determined. That is, the picture data $A(2)=1_1$, $A(3)=1_2$ are exchanged for the picture data $B(0)=4_1$, $B(1)=4_2$, and the picture data $A(6)=3_1$, $A(7)=3_2$ are exchanged for the picture data $B(4)=6_1$, $B(5)=6_2$ according to a phase-1 procedure. As a result, a first intermediate picture image shown in FIG. 6(b) is obtained and stored in the picture image storing unit 22.

Thereafter, the row number A is increased to A=1 in a step 107 to select succeeding row numbers A, B. Thereafter, it is judged in a step 108 whether or not the row number A increased in the step 107 satisfies the equation (15). Because the row number A is over an upper limit $k \times 2^L + 2^{L-1} - 1$, there is no other row to be selected in the row selecting unit 16. Therefore, the procedure proceeds to a step 109. In the step 109, the loop counting value k is increased to k=1. Thereafter, it is judged in a step 110 whether or not the value k satisfies the equation (16). Because the loop counting value k is not over an upper limit $N/2^L - 1$, the transposition of pieces of picture data is required on condition of k=1. Therefore, the procedure returns to the step 104, and the steps 104 to 108 are repeated in a middle loop on condition that k=1 is set.

In the steps 104, 105 of a phase-2 procedure, the A-th row numbered by the row number A=2 is selected, and the B-th row numbered by the row number B=3 is selected.

In the step 106 of the phase-2 procedure, the operation in the picture image transforming unit 28 is started under the control of the central processing unit 31 when the A-th row and the B-th row are selected. That is, the picture data which are placed in the A-th row (A=2) and tile B-th row (B=3) of the first intermediate picture image stored in the picture image storing unit 22 are transferred to the picture image transforming unit 28. Thereafter, the picture data A(j) placed in the A-th row (A=2) are transposed to the B-th row (B=3) according to the equations (12), (13) and (14) or are respectively held at the same row and column according to the equations (6), (7) and (14). Also, the picture data B(j) placed in the B-th row (B=3) are transposed to the A-th row (A=2) according to the equations (8), (9) and (14) or are respectively held at the same row and column according to the equations (10), (11) and (14).

For example, because m=2, L=1 and N=4 are satisfied, the picture data $A(0)=8_1$, $A(1)=8_2$, $B(2)=D_1$ and $B(3)=D_2$ are respectively held at the same row and column according to the equations (6), (7), (10) and (11) when p=0, the picture data $A(2)=9_1$, $A(3)=9_2$ are transposed to B'(0), B'(1) according to the equations (12), (13) when p=0, and the picture data $B(0)=C_1$, $B(1)=C_2$ are transposed to A'(2), A'(3) according to the equations (8), (9) when p=0. When p=1 is satisfied, the picture data $A(4)=A_1$, $A(5)=A_2$, $B(6)=F_1$ and $B(7)=F_2$ are respectively held at the same row and column according to the equations (6), (7), (10) and (11), the picture data $A(6)=B_1$, $A(7)=B_2$ are transposed to B'(4), B'(5) according to the equations (12), (13), and the picture data $B(4)=E_1$, $B(5)=E_2$ are transposed to $A'(6)$, $A'(7)$ according to the equations (8), (9).

The picture data $A'(j)$, $B'(j)$ are stored in the picture image storing unit 22 as tile picture data $A(j)$, $B(j)$ newly determined. That is, the picture data $A(2)=9_1$, $A(3)=9_2$ are exchanged for the picture data $B(0)=C_1$, $B(1)=C_2$, and the picture data $A(6)=B_1$, $A(7)=B_2$ are exchanged for the picture data $B(4)=E_1$, $B(5)=E_2$ according to the phase-2 procedure. As a result, a second intermediate picture image shown in FIG. 6(c) is obtained and stored in the picture image storing unit 22.

Thereafter, the procedure proceeds to the steps 107, 108, 109 and 110 in the same manner. Because the loop counting value k is over the upper limit $N/2^L-1$, there is no piece of picture data to be transposed in the transposition mode L=1. Therefore, the procedure proceeds to a step 111. In the step 111, the transposition mode L=1 is increased to L=2. Thereafter, it is judged in a step 112 whether or not the transposition mode L increased in the step 111 satisfies the equation (17). Because the transposition mode L=2 is not over the maximum value M, it is required to transpose one or more pieces of picture data of the second intermediate picture image in the transposition mode L=2. Therefore, the procedure returns to the step 103, and the steps 103 to 110 are repeated in an outer loop on condition that L=2 is set.

In the step 103 of a phase-3 procedure, the loop counting value k=0 is initially set. In the step 104, an initial value of the row number A=0 is selected in tile row selecting unit 27 because of k=0. In the step 105, an initial value of the row number B=2 is selected in the row selecting unit 27 because of the transposition mode L=2. The row numbers A, B selected are stored in the main storing unit 25.

In the step 106 of the phase-3 procedure, the operation in the picture image transforming unit 28 is started under the control of the central processing unit 31 when the A-th row numbered by the row number A=0 and the B-th row numbered by the row number B=2 are selected. That is, the picture data which are placed in the A-th row (A=0) and the B-th row (B=2) of the second intermediate picture data stored in the picture image storing unit 22 are transferred to the picture image transforming unit 28. Thereafter, a value p is limited to 0 according to the equation (14) because of L=2, and the picture data $A(j)$ placed in the A-th row (A=0) are transposed to the B-th row (B=2) according to the equations (12), (13) and (14) or are respectively held at the same row and column according to the equations (6), (7) and (14). Also, the picture data $B(j)$ placed in the B-th row (B=2) are transposed to the A-th row (A=0) according to the equations (8), (9) and (14) or are respectively held at the same row and column according to the equations (10), (11) and (14).

For example, because p=0, m=2, L=2 and N=4 are satisfied, the picture data $A(0)=0_1$, $A(1)=0_2$, $A(2)=4_1$, $A(3)=4_2$, $B(4)=A_1$, $B(4)=A_2$, $B(5)=E_1$ and $B(6)=E_2$ are respectively held at the same row and column according to the equations (6), (7), (10) and (11), the picture data $A(4)=2_1$, $A(5)=2_2$, $A(6)=6_1$, $A(7)=6_2$ are transposed to $B'(0)$, $B'(1)$, $B'(2)$ and $B'(3)$ according to the equations (12), (13), and the picture data $B(0)=8_1$, $B(1)=8_2$, $B(2)=C_1$, $B(3)=C_2$ are transposed to $A'(4)$, $A'(5)$, $A'(6)$ and $A'(7)$ according to the equations (8), (9).

The picture data $A'(j)$, $B'(j)$ are stored in the picture image storing unit 22 as the picture data $A(j)$, $B(j)$ newly determined. That is, the picture data $A(4)=2_1$, $A(5)=2_2$ are exchanged for the picture data $B(0)=8_1$, $B(1)=8_2$, and the picture data $A(6)=6_1$, $A(7)=6_2$ are exchanged for the picture data $B(2)=C_1$, $B(3)=C_2$ according to the phase-3 procedure.

As a result, a third intermediate picture image shown in FIG. 6(d) is obtained and stored in the picture image storing unit 22.

Thereafter, the row number A is increased to A=1 in the step 107 of a phase-4 procedure to select a succeeding A-th row numbered by the row number A=1. Thereafter, it is judged in the step 108 whether or not the row number A increased in the step 107 satisfies the equation (15). Because the row number A=1 is not over the upper limit $k \times 2^L + 2^{L-1} - 1$, there is another A-th row of which pieces of picture data are to be transposed. Therefore, the procedure returns to the step 105, and the steps 105 to 106 are repeated ill an inner loop on condition that A=1 is set. In the step 105 of the phase-4 procedure, the B-th row numbered by the row number B=3 is selected in the row selecting unit 27 because of the transposition mode L=2.

In the step 106 of the phase-4 procedure, the operation in the picture image transforming unit 28 is started under the control of the central processing unit 31 when the A-th row and the B-th row are selected in the row selecting unit 27. That is, the picture data which are placed in the A-th row (A=1) and the B-throw (B=3) of the third intermediate picture image stored in the picture image storing unit 22 are transferred to the picture data exchanging unit 28. Thereafter, a value p is limited to 0 according to the equation (14) because of L=2, and the picture data $A(j)$ placed in the A-th row (A=1) are transposed to the B-th row (B=3) according to the equations (12), (13) and (14) or are respectively held at the same row and column according to the equations (6), (7) and (14). Also, the picture data $B(j)$ placed in the B-th row (B=3) are transposed to the A-th row (A=1) according to the equations (8), (9) and (14) or are respectively held at the same row and column according to the equations (10), (11) and (14).

For example, because p=0, m=2, L=2 and N=4 are satisfied, the picture data $A(0)=1_1$, $A(1)=1_2$, $A(2)=5_1$, $A(3)=5_2$, $B(4)=B_1$, $B(4)=B_2$, $B(5)=F_1$ and $B(6)=F_2$ are respectively held at the same row and column according to the equations (6), (7), (10) and (11), the picture data $A(4)=3_1$, $A(5)=3_2$, $A(6)=7_1$, $A(7)=7_2$ are transposed to $B'(0)$, $B'(1)$, $B'(2)$ and $B'(3)$ according to the equations (12), (13), and the picture data $B(0)=9_1$, $B(1)=9_2$, $B(2)=D_1$, $B(3)=D_2$ are transposed to $A'(4)$, $A'(5)$, $A'(6)$ and $A'(7)$ according to the equations (8), (9).

The picture data $A'(j)$, $B'(j)$ are stored in the picture image storing unit 22 as the picture data $A(j)$, $B(j)$ newly determined. That is, the picture data $A(4)=3_1$, $A(5)=3_2$ are exchanged for the picture data $B(0)=9_1$, $B(1)=9_2$, and the picture data $A(6)=7_1$, $A(7)=7_2$ are exchanged for the picture data $B(2)=D_1$, $B(3)=D_2$ according to the phase-4 procedure. As a result, a quasi-transposed picture image shown in FIG. 6(e) is obtained and stored in the picture image storing unit 22.

Thereafter, the procedure proceeds to the steps 107 to 111 in that order, and the transposition mode L=3 is set in the step 111. Thereafter, because L=3 is larger than the maximum value M=2, there is no piece of picture data to be transposed. Therefore, the procedure proceeds from the step 112 to a step 113.

In the step 113, it is judged whether the rotation data stored in the main storing unit 25 designates the rotation in a clockwise direction or the rotation in a counterclockwise direction. The rotation data is input by an operator in advance. In cases where the rotation in the clockwise direction is designated, the procedure proceeds to a step 114. In the step 114, the quasi-transposed picture image stored in the picture image storing unit 22 is transferred to the column order changing unit 29, and the order of the picture data arranged in the same row of the quasi-transposed picture image is changed to form a first destination picture image obtained by rotating the multivalued source picture image 90 degrees in a clockwise direction. In detail, each of the picture data $E(i,j)$ of the quasi-transposed picture image placed in the j-th columns (j=0,1,2, - - - ,7) is transposed to another column in the same row according to the equations (18), (19) and (21).

For example, because m=2 and N=4 are satisfied, a value q ranges $0 \leq q \leq 1$. When q=0 is set, the picture data $E(0,0)=0_1$, $E(0,2)=4_1$, $E(0,4)=8_1$ and $E(0,6)=C_1$ in the zero-th row (i=0) are transposed to $F(0,6)$, $F(0,4)$, $F(0,2)$ and $F(0,0)$. Thereafter, when q=1 is set, the picture data $E(0,1)=0_2$, $E(0,3)=4_2$, $E(0,5)=8_2$ and $E(0,7)=C_2$ in the zero-th row (i=0) are transposed to $F(0,7)$, $F(0,5)$, $F(0,3)$ and $F(0,1)$. Also, the order of the picture data in each of the i-th rows (i=1,2,3) are changed in the same manner, Thereafter, the picture data $F(i,j)$ are stored in the picture image storing unit 22 as the picture data $E(i,j)$ newly determined. That is, a set of the picture data $(0_1, 0_2)$ are exchanged for another set of the picture data $(C_1, C_2)$, and a set of the picture data $(4_1, 4_2)$ are exchanged for another set of the picture data $(8_1, 8_2)$. As a result, a first destination picture image shown in FIG. 6(*f*) is obtained according to a phase-5 procedure and is stored in the picture image storing unit 22.

In contrast, in cases where the rotation data designates the rotation in the counterclockwise direction, the procedure proceeds to a step 115. In the step 115, the quasi-transposed picture image stored in the picture image storing unit 22 is transferred to the row order changing unit 30, and the order of the picture data arranged in the same column of the quasi-transposed picture image is changed to form a second destination picture image obtained by rotating the multivalued source picture image 90 degrees in a counterclockwise direction. In detail, each of the picture data $E(i,j)$ of the quasi-transposed picture image placed in the i-th rows (i=0,1,2,3) and a j-th column is transposed to another row of the same j-th column according to the equations (22) to (24).

For example, because m=2 and N=4 are satisfied, the picture data $E(0,j)=0_1$, $E(1,j)=1_1$, $E(2,j)=2_1$ and $E(3,j)=3_1$ in the j-th column (j=0) are transposed to $G(3, j)$, $G(2, j)$, $G(1, j)$ and $G(0,j)$. Also, the picture data in the j-th columns(j= 1,2,3) are transposed in the same manner. Thereafter, the picture data $G(i,j)$ are stored in the picture image storing unit 22 as the picture data $E(i,j)$ newly determined. That is, a set of the picture data $(0_1,0_2,4_1,4_2,8_1,8_2,C_1,C_2)$ in the i-th row (i=0) is exchanged for another set of tile picture data $(3_1,3_2,7_1,7_2,B_1,B_2,F_1,F_2)$ in the i-th row (i=3), and a set of the picture data $(1_1,1_2,5_1,5_2,9_1,9_2,D_1,D_2)$ in the i-th row (i=1) is exchanged for another set of tile picture data $(2_1,2_2,6_1,6_2,A_1,A_2,E_1,E_2)$ in the i-th row (i=2). As a result, a second destination picture image shown in FIG. 6(*g*) is obtained according to a phase-6 procedure and is stored in the picture image storing unit 22.

Accordingly, even though any multivalued source picture image is stored in the cache memory 23 of the image data storing unit 22 having a general memory configuration and is read in a word unit (or a row unit) from the cache memory 23, the first or second destination picture image can be obtained at high speed because no more than five types of phase procedures (the phase-1 to phase-5 procedures, or the phase-1 to phase-4 and the phase-6 procedures) are required.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. An apparatus for rotating 90 degrees a multivalued source picture image consisting of pieces of picture data $a_{ij}$ (i =0,1, - - - ,N, j=0,1, - - - , m*N–1) arranged in a matrix of N rows×(m gradations*N) columns, comprising:

picture image storing means for storing a multivalued source picture image consisting of pieces of picture data $a_{ij}$ (i=0,1, - - - , N, j=0,1, - - - , m*N–1) arranged in a matrix of N rows×(m gradations*N) columns;

transposition mode calculating means for calculating a maximum value M of a transposition mode L according to a first equation M=[log$_2$N] by utilizing the number N of rows or columns of the multivalued source picture image stored in the picture image storing means, the symbol [x] denoting a ceiling function of a constant x in which a value of [x] agrees with a value of the constant x when the constant x equals a positive integer or a value of [x] agrees with an integer determined by raising a decimal fraction of the constant x to a unit when the constant x has the decimal fraction;

row selecting means for numbering a series of rows of the multivalued source picture image stored in the picture image storing means from a 0-th row to an (N–1)-th row, numbering a series of columns of the multivalued source picture image from a 0-th column to an (m*N–1)-th column, repeatedly selecting an A-th row having a row number A while increasing the row number A in increments of 1 in the range from a minimum value $k*2^L$ of the row number A to a maximum value $k*2^L+2^{L-1}-1$ of the row number A and increasing the loop counting value k in increments of 1 in the range from 0 to $N/2^L-1$ each time the transposition mode L is increased in increments of 1 in the range from L=1 to the maximum value M of the transposition mode L calculated in the transposition mode calculating means, and repeatedly selecting a B-th row having a row number B according to a second equation $B=A+2^{L-1}$ each time the A-th row is selected;

picture image transforming means for representing the picture data placed in the A-th row of the multivalued source picture image by A(j) each time the A-th row is selected in the row selecting means, representing the picture data placed in the B-th row of the multivalued source picture image by B(j) each time the B-th row is selected in the row selecting means, and transforming the multivalued source picture image to a quasi-transposed picture image by transposing one or more pieces of picture data placed in the A-th row according to a third equation $B'(j)=A(j+m*2^{L-1})$ in a range of the columns $p*m*2^L \leq j \leq p*m*2^L+m*2^{L-1}-1$ while increasing a variable p from 0 to $N/2^L-1$ in increments of 1, transposing one or more pieces of picture data placed in the B-th row according to a fourth equation $A'(j)=B(j-m*2^{L-1})$ in a range of the columns $p*m*2^L+m*2^{L-1} \leq j \leq p*m*2^L+m*2^L-1$ while increasing a variable p from 0 to $N/2^L-1$ in increments of 1, holding each of remaining pieces of picture data placed in the A-th row at the same row and column according to a fifth equation $A'(j)=A(j)$ in a range of the columns $p*m*2^L \leq j \leq p*m*2^L+m*2^{L-1}-1$ while increasing a variable p from 0 to $N/2^L-1$ in increments of 1, holding each of remaining pieces of picture data placed in the B-th row at the same row and column according to a sixth equation $B'(j)=B(j)$ in a range of the columns $p*m*2^L+m*2^{L-1} \leq j \leq p*m*2^L+m*2^L-1$ while increasing a variable p from 0 to $N/2^L-1$ in increments of 1, and regarding the picture data A'(j), B'(j) as pieces of picture data A(j), B(j) renewed each time the A-th row and the B-th row are selected in the row selecting means;

column order changing means for representing the picture data of the quasi-transposed picture image formed in the picture image transforming means by E(i,j), and transposing the picture data E(i,j) of the quasi-transposed picture image according to a seventh equation F(i, m*j+q)=E(i, m*(N−j−1)+q) in a column range of $0 \leq j \leq N-1$, a row range of $0 \leq i \leq N-1$ and a variable range of $0 \leq q \leq m-1$ to change the order of the picture data E(i,j) arranged in the same row for each of the rows, a destination picture image which is defined as a picture image obtained by rotating the multivalued source picture image 90 degrees in a clockwise direction being formed of the picture data F(i,j);

displaying means for displaying the destination picture image consisting of the picture data F(i,j) which are produced in the column order changing means; and central processing means for controlling operations in the picture image storing means, the transposition mode calculating means, the row selecting means, the picture image transforming means, the column orders changing means and the displaying means.

2. An apparatus according to claim 1 additionally including row order changing means for transposing the picture data E(i,j) of the quasi-transposed picture image formed in the picture image transforming means according to an eighth equation G(i,j)=E(N−i−1,j) in a row range of $0 \leq i \leq N-1$ and a column range of $0 \leq j \leq m*N-1$ to change the order of the picture data E(i,j) arranged in the same column for each of the rows, a second destination picture image which is defined as a picture image obtained by rotating the multivalued source picture image 90 degrees in a counterclockwise direction being formed of the picture data G(i,j).

3. An apparatus for rotating 90 degrees a multivalued source picture image consisting of pieces of picture data $a_{ij}$ (i=0,1, - - - , N, j=0,1, - - - , m*N−1) arranged in a matrix of N rows×(m gradations*N) columns, comprising:

picture image storing means for storing a multivalued source picture image consisting of pieces of picture data $a_{ij}$ (i=0,1, - - - ,N, j=0,1, - - - , m*N−1) arranged in a matrix of N rows×(m gradations*N) columns;

transposing mode calculating means for calculating a maximum value M of a transposition mode L according to a first equation M=[log$_2$N] by utilizing the number N of rows or columns of the multivalued source picture image stored in the picture image storing means, the symbol [x] denoting a ceiling function of a constant x in which a value of [x] agrees with a value of the constant x when the constant x equals a positive integer or a value of [x] agrees with an integer determined by raising a decimal fraction of the constant x to a unit when the constant x has the decimal fraction;

row selecting means for numbering a series of rows of the multivalued source picture image stored in the picture image storing means from a 0-th row to an (N−1)-th row, number a series of columns of the multivalued source picture image from a 0-th column to an (m*N−1)-th column, repeatedly selecting an A-th row having a row number A while increasing the row number A in increments of 1 in the range from a minimum value $k*2^L$ of the row number A to a maximum value $k*2^L+2^{L-1}-1$ of the row number A and increasing the loop counting value k in increments of 1 in the range from 0 to $N/2^L-1$ each time the transposition mode L is increased in increments of 1 in the range from L=1 to the maximum value M of the transposition mode L calculated in the transposition mode calculating means, and repeatedly selecting a B-th row having a row number B according to a second equation $B=A+2^{L-1}$ each time the A-th row is selected;

picture image transforming means for representing the picture data placed in the A-th row of the multivalued source picture image by A(j) each time the A-th row is selected in the row selecting means, representing the picture data placed in the B-th row of the multivalued source picture image by B(j) each time the B-th row is selected in the row selecting means, and transforming the multivalued source picture image to a quasi-transposed picture image by transposing one or more pieces of picture data placed in the A-th row according to a third equation $B'(j)=A(j+m*2^{L-1})$ in a range of the columns $p*m*2^L \leq j \leq p*m*2^L+m*2^{L-1}-1$ while increasing a variable p from 0 to N/2L−1 in increment of 1, transposing one or more pieces of picture data placed in the B-th row according to a fourth equation $A'(j)=B(j-m*2^{L-1})$ in a range of the columns $p*m*2^L+m*2^{L-1} \leq j \leq p*m*2^L+m*2^L-1$ while increasing a variable p from 0 to $N/2^L-1$ in increments of 1, holding each of remaining pieces of picture data placed in the A-th row at the same row and column according to a fifth equation A'(j)=A(j) in a range of the columns $p*m*2^L \leq j \leq p*m*2^L+m*2^{L-1}-1$ while increasing a variable p from 0 to $N/2^L-1$ in increments of 1, holding each of remaining pieces of picture data placed in the B-th row at the same row and column according to a sixth equation B'(j)=B(j) in a range of the columns $p*m*2^L+m*2^{L-1} \leq j \leq p*m*2^L+m*2^L-1$ while increasing a variable p from 0 to $N/2^L-1$ in increments of 1, and regarding the picture data A'(j), B'(j) as pieces of picture data A(j), B(j) renewed each time the A-th row and the B-th row are selected in the row selecting means;

row order changing means for representing the picture data of the quasi-transposed picture image formed in the picture image transforming means by E(i,j), and transposing the picture data E(i,j) of the quasi-transposed picture image according to a seventh equation G(i,j)=E(N−i−1,j) in a row range of $0 \leq j \leq N-1$ and a column range of $0 \leq j \leq m*N-1$ to change the order of the picture data E(i,j) arranged in the same column for each of the rows, a destination picture image which is defined as a picture image obtained by rotating the multivalued source picture image 90 degrees in a counterclockwise direction being formed of the picture data G(i,j);

displaying means for displaying the destination picture image consisting of the picture data G(i,j) which are produced in the column order changing means; and central processing means for controlling operations in the picture image storing means, the transposition mode calculating means, the row selecting means, the picture image transforming means, the column order changing means and the displaying means.

* * * * *